United States Patent [19]

Scarlata

[11] Patent Number: 5,218,175
[45] Date of Patent: Jun. 8, 1993

[54] VEHICLE ELECTROACOUSTICAL TRANSDUCING

[75] Inventor: Stephen Scarlata, Hopkinton, Mass.
[73] Assignee: Bose Corporation, Framingham, Mass.
[21] Appl. No.: 637,317
[22] Filed: Jan. 3, 1991
[51] Int. Cl.$^5$ .............................................. H05K 5/00
[52] U.S. Cl. ................................... 181/141; 181/148; 181/150
[58] Field of Search .................. 181/141, 148, 150; 381/86

[56] References Cited

U.S. PATENT DOCUMENTS

4,493,389  1/1985  Del Rosario .................... 181/141 X
4,924,962  5/1990  Terai et al. ........................ 381/86 X

Primary Examiner—Michael L. Gellner
Assistant Examiner—Eddie C. Lee
Attorney, Agent, or Firm—Fish & Richardson

[57] ABSTRACT

A vehicle loudspeaker system includes a vehicle body having inside surfaces enclosing a passenger compartment. At least one elongated conduit has a proximal portion and a distal portion. A loudspeaker driver is disposed in the vehicle body outside the passenger compartment. The loudspeaker driver has a vibratile surface for generating sound pressure waves in response to electrical stimulation. The proximal portion of the elongated conduit is open to one side of the vibratile surface. The distal portion is open to the passenger compartment. The elongated conduit extends from the vibratile surface into the passenger compartment with an effective length corresponding substantially to a quarter wavelength at the lowest frequency of sound pressure waves to be transmitted between the vibratile surface and the passenger compartment. The loudspeaker driver is characterized by moving mass and an unloaded natural resonant frequency at a first bass frequency. The elongated conduit encloses a relatively large air mass sufficiently large to coact with the loudspeaker driver and present a load that effectively increases the moving mass so that the loudspeaker driver loaded by the air mass is characterized by a loaded natural resonant frequency at a second bass frequency significantly lower than the first bass frequency.

14 Claims, 11 Drawing Sheets

VEHICLE ELECTROACOUSTICAL TRANSDUCING

The present invention relates in general to vehicle electroacoustical transducing and more particularly to such transducing comprising acoustic mass loading.

In general, in one aspect, the invention features a loudspeaker system for radiation into the passenger compartment of a vehicle. One or more elongated acoustic conduits efficiently transfer sound pressure energy from a loudspeaker driver outside the compartment into the compartment.

Preferably there is a single elongated acoustic conduit of sufficient air volume to provide air mass loading on the loudspeaker driver.

Yet another preferred embodiment of the invention includes acoustically isolating the loudspeaker driver in the trunk compartment of the vehicle, and locating the output port of the acoustic conduit inside the passenger compartment, under a passenger seat.

In general, in another aspect, the invention features a loudspeaker system for radiation into the passenger compartment of a vehicle where an air mass resonance tuned-port enclosure efficiently transfers sound pressure energy from a loudspeaker driver outside the compartment into the compartment.

Numerous other features and advantages will become apparent from the following detailed description when read in connection with the accompanying drawings in which.

Figure 1:
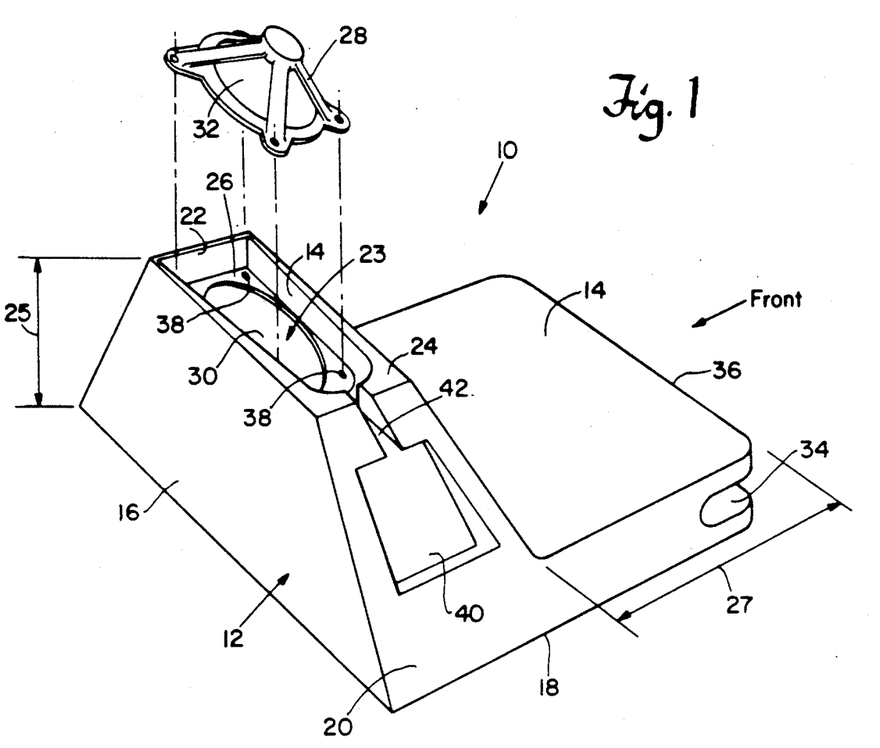
FIG. 1 is a perspective view of an embodiment of the acoustic conduit portion of a loudspeaker system of this invention.
Figure 2:
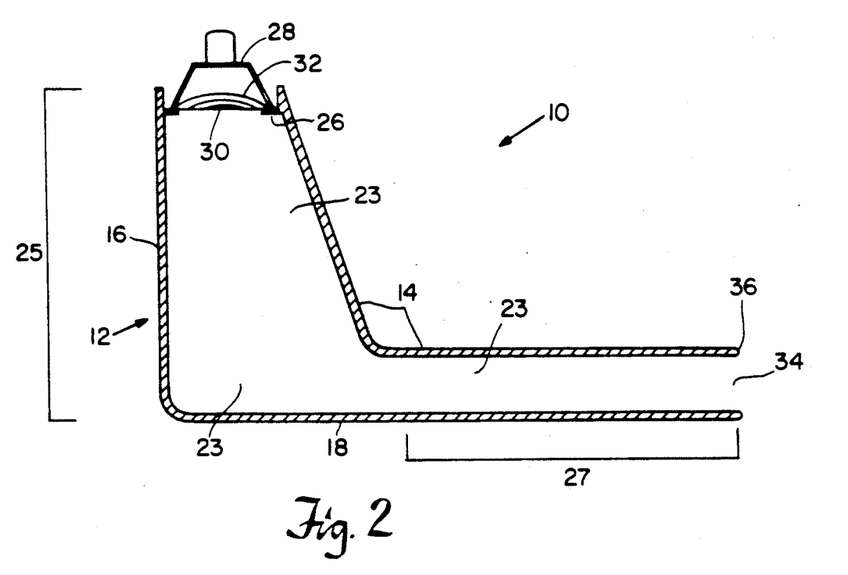
FIG. 2 is a side cross sectional view of the acoustic conduit of FIG. 1.

Referring to FIGS. and 2, there is shown an embodiment of a loudspeaker system 10, characterized by a deep bass response, suitable for installation in an automobile. Loudspeaker system 10 includes an acoustic conduit 12 having a front surface 14, a rear surface 16, a bottom surface 18, side surfaces 20 and 22, and top surface 24. Surfaces 14, 16, 18, 20, 22 and 24 define acoustic cavity 23. Acoustic conduit 12 has a vertically oriented proximal portion 25 and a horizontally oriented distal portion 27. Speaker shelf 26 is recessed in top surface 24 and provides a mounting surface for loudspeaker driver 28. Speaker shelf aperture 30, centrally disposed in speaker shelf 26, is oval shaped and sized to approximate the geometry of the front face of the typically 6"×9" speaker cone 32 of loudspeaker driver 28, and provides the proximal opening, or input port, to acoustic cavity 23 (FIG. 2). Acoustic conduit output port 34 is a longitudinal aperture extending parallel with front edge 36, and partly along each side surface 20 and 22, to provide the distal opening of acoustic cavity 23.

Loudspeaker driver 28 is mounted on speaker shelf 26 by means of four mounting holes 38 (two shown), which align with similar holes in the driver, and fasteners such as nuts and bolts. Speaker shelf 26 is made from material of sufficient stiffness to acoustically isolate the sound pressure waves, or front waves, generated by the front of speaker cone 32 (i.e., pressure wave directed into acoustic cavity 23) from the sound pressure waves, or back waves, generated by the back of speaker cone 32 (i.e., pressure waves directed into the medium surrounding acoustic conduit 12). Similarly, surfaces 14, 16, 18, 20 and 24 are made from material of sufficient stiffness to prevent sound pressure waves present in the medium surrounding acoustic conduit 12 from coupling through the surfaces into acoustic cavity 23.

Indentation 40 on side surface 20 provides a mounting space accommodating electronics associated with loudspeaker system 10 (i.e., electronic frequency equalization circuitry and audio power amplifiers). Wire trough 42 provides a channel for routing wires from the electronics, mounted in indentation 40, to loudspeaker driver 28 mounted on speaker shelf 26.

Figure 3:
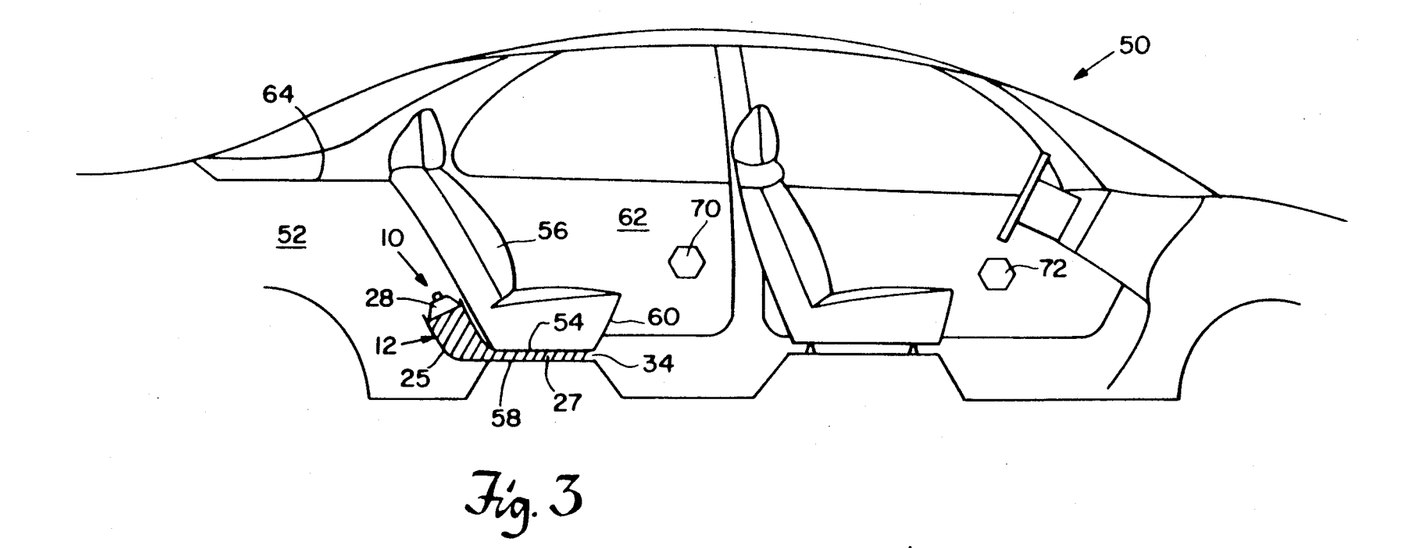
FIG. 3 is a side view of the acoustic conduit of FIG. 1 mounted in an automobile.

Referring to FIG. 3, there is shown loudspeaker system 10 installed in automobile 50. Loudspeaker driver 28 and proximal portion 25 of acoustic conduit 12 are located in enclosed automobile trunk 52. Distal portion 27 of acoustic conduit 12 is sandwiched between the bottom 54 of rear seat and car frame 58. Acoustic conduit 12 output port 34, substantially parallel with the front 60 of rear seat 56, opens into passenger compartment 62.

Acoustic conduit 12 provides a direct path for front waves (i.e., sound pressure waves generated by the front of speaker cone 32) into passenger compartment 62. Back waves (i.e., sound pressure waves generated by the back of speaker cone 32) are directed into automobile trunk 52, which is a large sealed enclosure substantially acoustically isolated from passenger compartment 62. Thus, automobile trunk 52 acts as an "infinite baffle", preventing back waves from cancelling the desired front waves in the listening environment (i.e., passenger compartment 62). Further, in most automobiles the trunk is sufficiently large to provide a very high compliance to loudspeaker driver 28 so that loudspeaker cone 32 moves freely, thereby increasing loudspeaker sensitivity.

Loudspeaker system 10 may be used with a wide variety of supplemental loudspeaker drivers and loudspeaker driver configurations to complement its deep bass response with full range stereophonic audio. For instance, left and right rear door mounted sound module 70 (left module shown), and, left and right front door mounted sound modules 72 (left module shown), provide full listening range stereophonic output into passenger compartment 62. Each rear door mounted module 70 preferably includes a loudspeaker driver and amplifier providing mid to high frequency sound reproduction. Each front door mounted module 72 preferably includes a coaxial loudspeaker driver providing low to high frequency sound reproduction.

Figure 4:
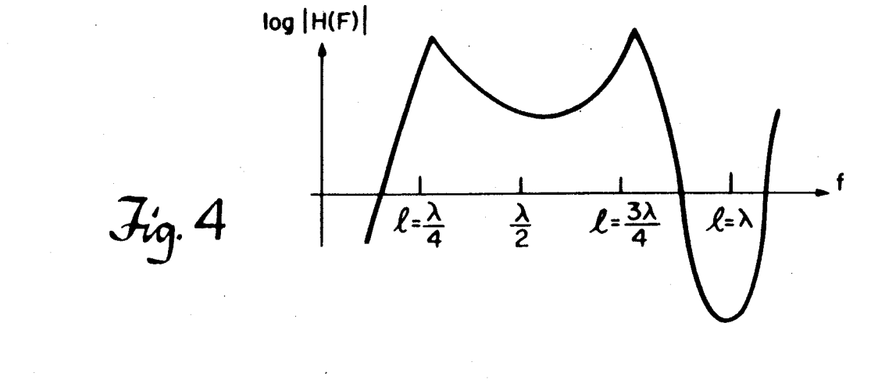
FIG. 4 is a graphic illustration of the frequency response of a loudspeaker system utilizing a single acoustic conduit.

Referring to FIG. 4, there is shown the frequency response for a system with a loudspeaker driver at the inner end of long tubular acoustic waveguide formed by acoustic conduit 21 (FIG. 1). Because the acoustic impedance presented at output port 34 does not terminate the acoustic transmission line formed by acoustic conduit 21 in its characteristic acoustic impedance, the pressure waves launched by the front of loudspeaker driver 28 are reflected at the open output port 34 to create standing waves inside acoustic conduit 21. As described in Bose, U.S. Pat. No. 4,628,528, for a given driving frequency, the envelope of the resulting standing wave in the tubular waveguide is sinusoidal with minima, maxima and relative phase dependent upon the length of the tubular waveguide and the driving frequency. The waveguide transforms a pressure source comprising loudspeaker driver 28 into a velocity source at output port 34.

As shown in FIG. 4, the frequency at which the length of a tubular waveguide is an odd multiple of one-quarter of the wavelength ($1 = \lambda/4$) results in a peak in the output. At frequencies in between there is reduced output. A phase reversal occurs in the region embracing the frequency corresponding to the guide wavelength.

Figure 5:
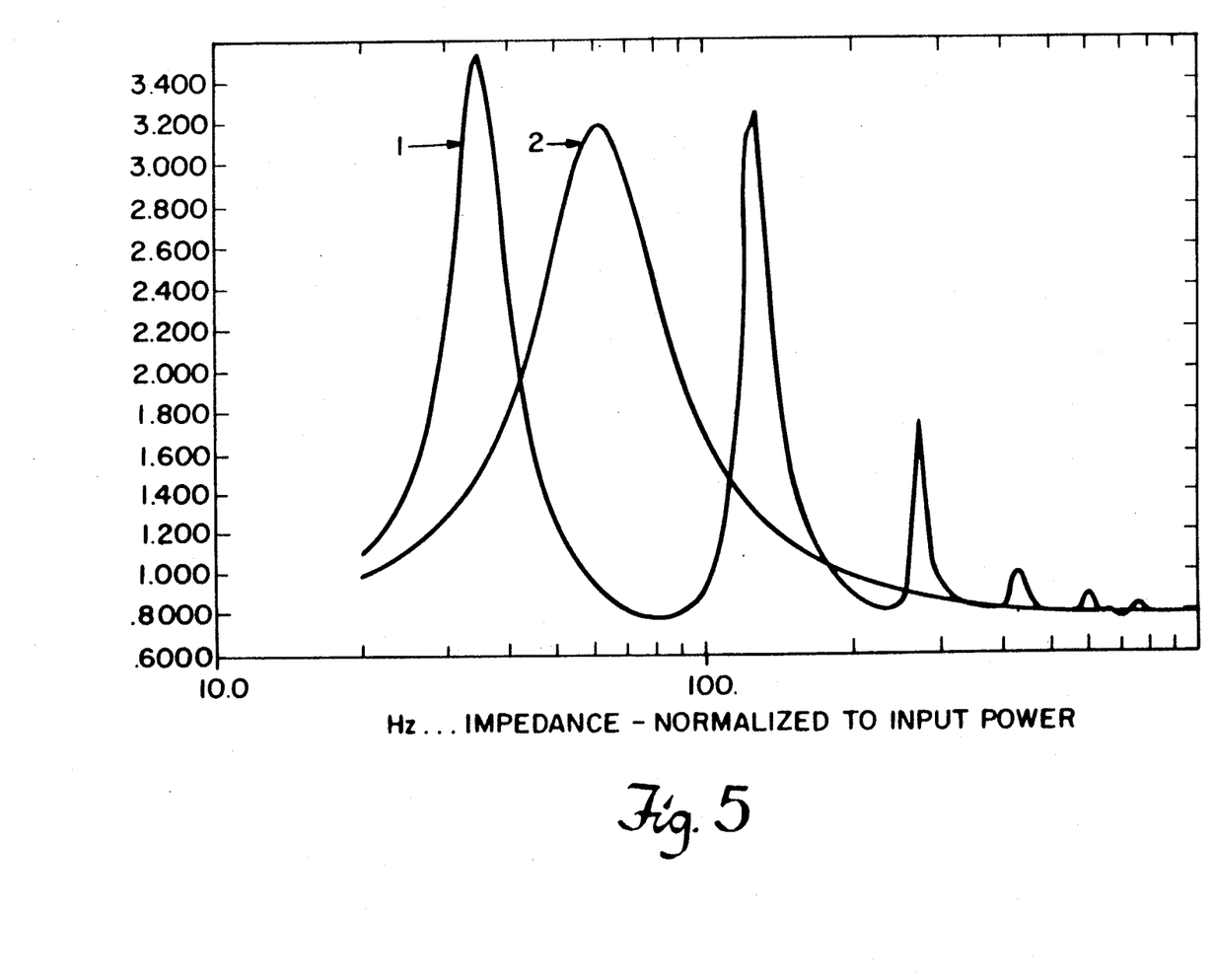
FIG. 5 shows the electrical impedance frequency response for the loudspeaker driver alone and mounted in the acoustic conduit of FIG. 1.

Referring to FIG. 5, there is shown a graph of the electrical loudspeaker driver impedance, normalized to input power, versus frequency of the loudspeaker system embodiment of FIG. 1 (trace 1), overlaid on a graph of the electrical loudspeaker driver impedance, normalized to input power, of loudspeaker driver 28 alone (trace 2). Electrical loudspeaker driver impedance roughly tracks the loudspeaker cone 32 excursion amplitude for a given input power. Electrical loudspeaker driver impedance is high at frequencies experiencing large cone excursions (i.e., low pressure on the cone), and low for small cone excursions (i.e., high pressure on the cone). Large loudspeaker cone excursions occur at natural system resonances, which are accordingly indicated on the graph as positive peaks in the electrical loudspeaker driver impedance frequency response. For instance, trace 2 of FIG. 5 indicates that loudspeaker driver 28, by itself, has a natural resonance at about 65 Hz.. Similarly, trace 1 of FIG. 5 indicates that loudspeaker driver 28 incorporated in loudspeaker system 10 (FIG. 1) has a series of resonances, of 35 Hz. and 120 Hz..

Acoustic cavity 23 (FIG. 2) of loudspeaker system 10 acts as a single acoustic waveguide, containing a relatively large air mass, to effectively transform the natural electrical impedance response of loudspeaker driver 28 (trace 2) to the loudspeaker system electrical impedance response of trace 1. The effective length of acoustic cavity 23 from input port 30 to output port 34 is equivalent to one quarter wavelength at about 80 Hz.. This is verified from trace 1 by the sharp dips in the impedance graph at about 80 and 160 Hz.. These dips indicate small cone excursions at the acoustic pressure peaks encountered by speaker cone 32, caused by the phase of the standing waves within acoustic cavity 23 at the one quarter and three quarter wavelength frequencies respectively. The electrical loudspeaker driver impedance peak occurring between 80 and 160 Hz. (i.e., about 120 Hz.) corresponds to the relatively large cone excursions allowed by the acoustic pressure local minimum encountered by speaker cone 32 between one quarter and three quarter wavelength frequencies.

Further, the relatively large air mass within acoustic cavity 23 presents a load to speaker cone 32, effectively increasing the loudspeaker driver's 28 moving mass. This results in lowering the natural resonant frequency of loudspeaker driver 28 from about 65 Hz. (i.e., the positive peak in the electrical loudspeaker driver impedance graph of trace 2) to about 35 Hz. (i.e., the far left positive peak of trace 1). Thus, the combined effects of an acoustic waveguide and air mass loading dramatically change the response of loudspeaker driver 28 when incorporated as a component in loudspeaker system 10 of FIG. 1.

Figure 6:
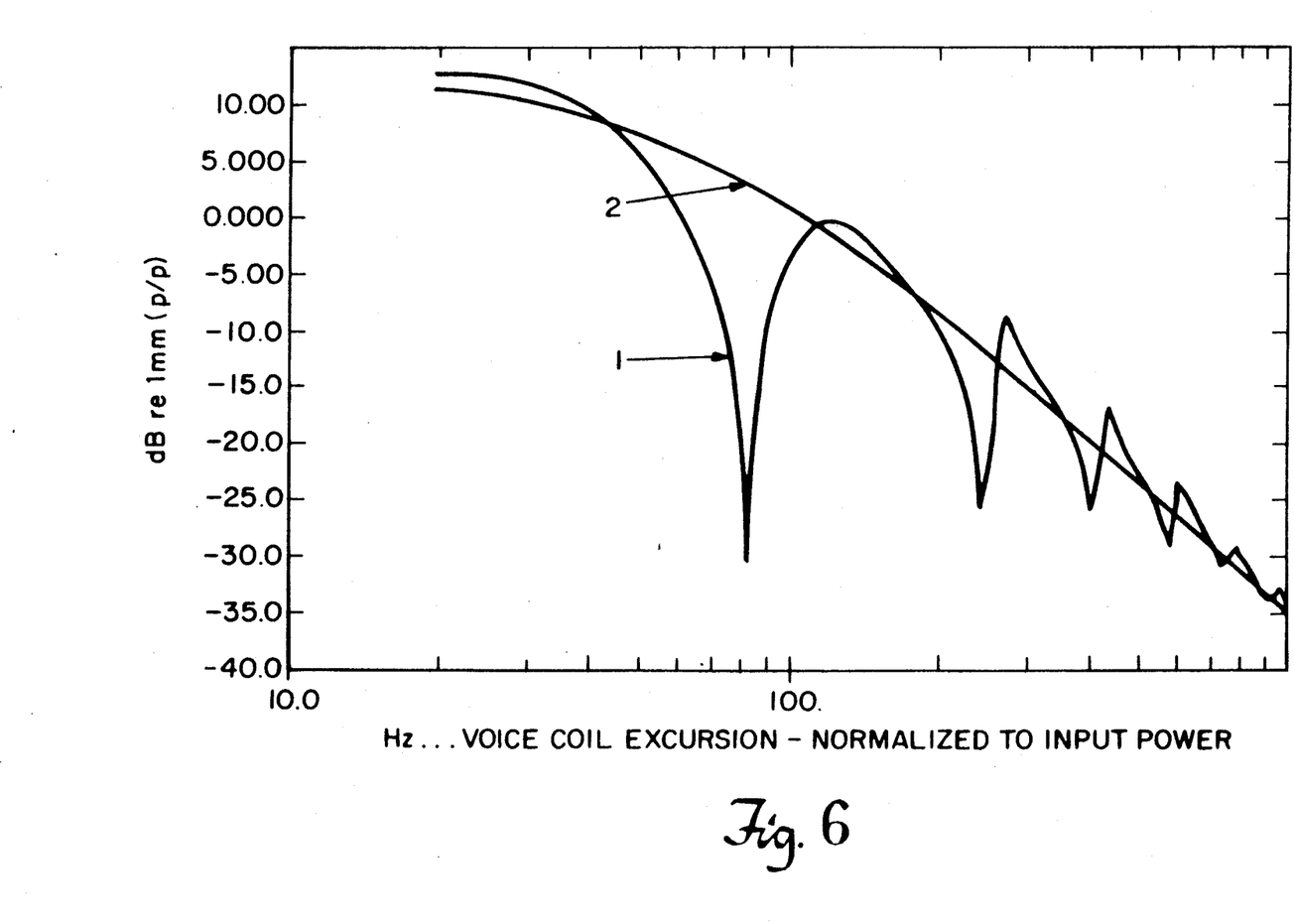
FIG. 6 shows the cone excursion frequency response for the loudspeaker driver alone and mounted in the acoustic conduit of FIG. 1.

Referring to FIG. 6, there is shown a graph of excursion amplitude, in dB referenced to one mm and normalized to input power (i.e., 0 dB = 1 mm, 6 dB = 2 mm, etc.) versus frequency for speaker cone 32 of loudspeaker driver 28 both by itself (trace 2), and in loudspeaker system 10 (trace 1). Consistent with the above discussion of electrical loudspeaker driver impedance, the natural cone excursion response of trace 2 is transformed into the cone excursion response of trace 1 by pressure loading on the cone caused by the combination of standing acoustic waves and the large air mass within acoustic cavity 23. Loudspeaker system 10 has cone excursion minimums at about 80 Hz. and 160 Hz. (as well as at higher harmonics of 80 Hz.) due to the high pressure at speaker cone 32 caused by standing waves in acoustic cavity 23 at these frequencies, as discussed above. Cone excursions reach a maximum for both traces 1 and 2 as they approach the lowest reproducible audio frequencies (i.e., 20 Hz.).

Figure 7:
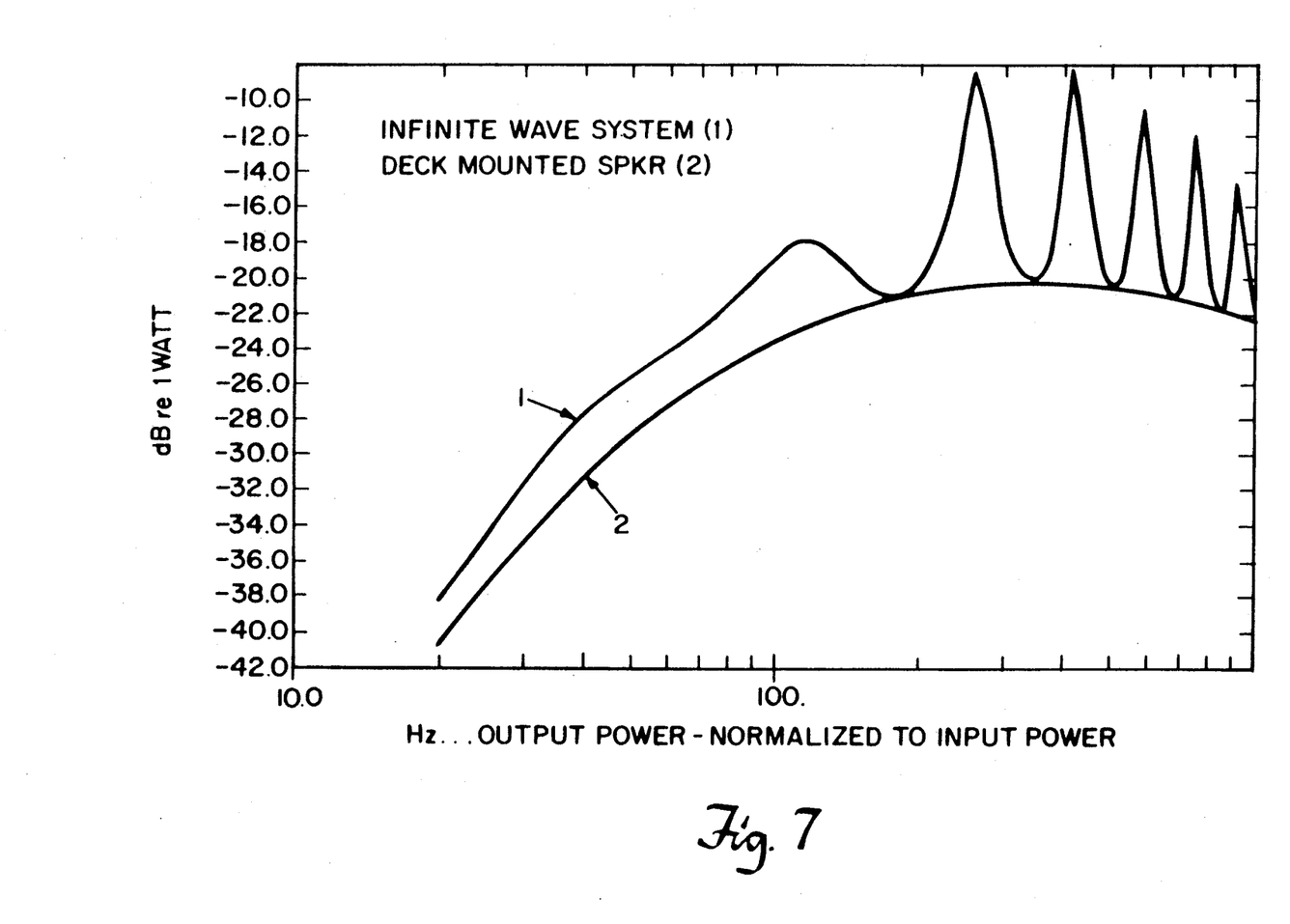
FIG. 7 shows the power output frequency response for the loudspeaker driver alone and mounted in the acoustic conduit of FIG. 1.
Figure 8:
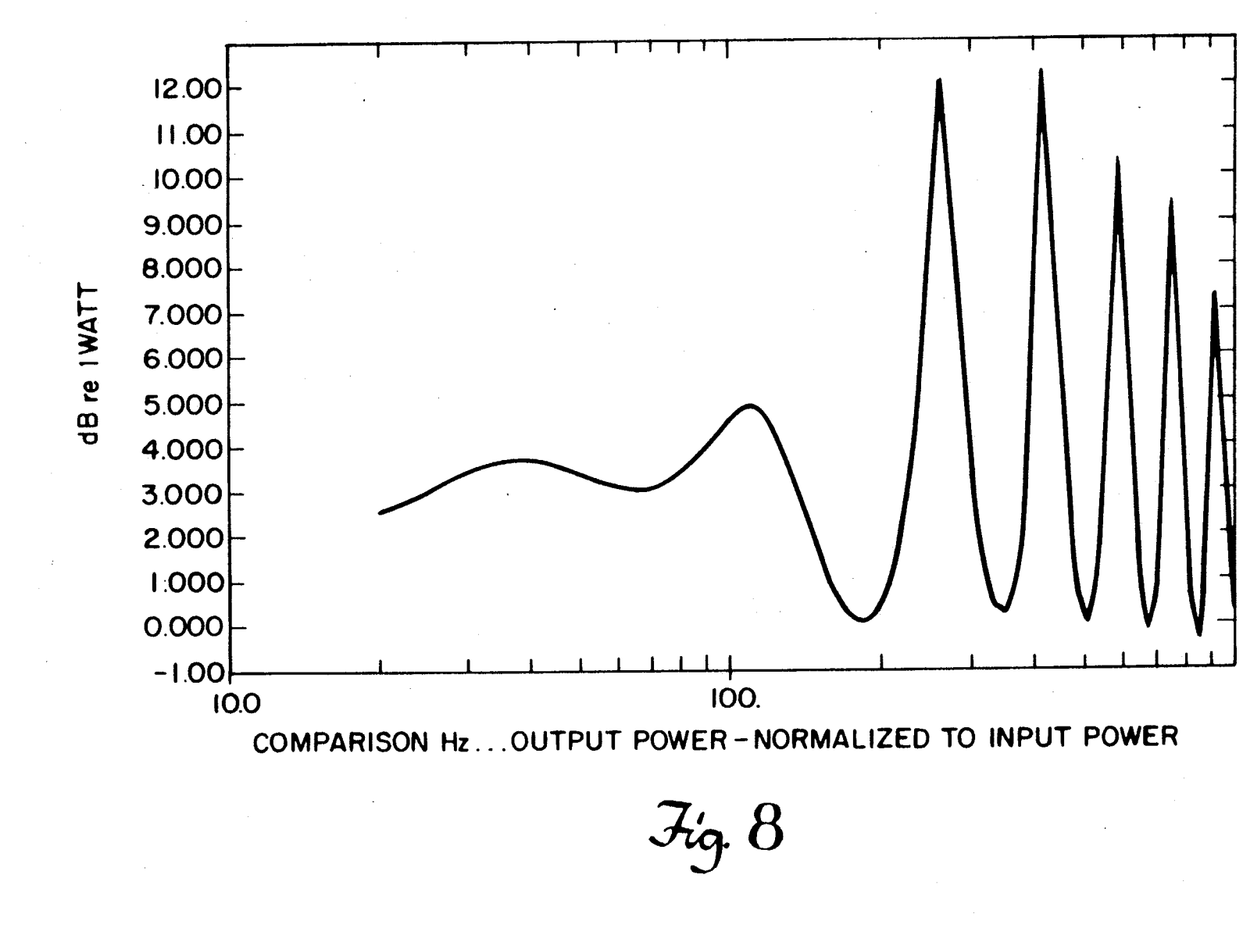
FIG. 8 shows the difference between the two power output frequency responses of FIG. 7.

Referring to FIGS. 7 and 8, there are shown graphs of loudspeaker system 10 performance gains over a conventional rear deck mounted automobile loudspeaker driver of the same type (i.e., loudspeaker driver 28) used to drive loudspeaker system 10. FIG. 7 shows loudspeaker system 10 (trace 2) acoustic output power, in dB relative to 1 watt input, versus frequency, overlaid on a graph of acoustic output power versus frequency for loudspeaker driver 28 (trace 1) mounted on the rear deck 64 (FIG. 3) of automobile 50. FIG. 8 is a graph of the difference between trace 1 and trace 2 of FIG. 7 (i.e., [trace 1−trace 2] in dB). As apparent from the graphs, there is significant power gain, on the order of about 3 to 5 dB, over a frequency range of about 30 to 150 Hz.. This corresponds well to the intended operational frequency range for the deep bass reproduction desired from loudspeaker system 10.

This embodiment offers several compelling advantages in reproducing deep bass audio over conventional rear deck mounted automobile loudspeakers.

As described above acoustic conduit 12 of loudspeaker system 10 acts as a waveguide and air mass load to boost the loudspeaker driver output by approximately 3 to 5 dB in the deep bass range of 30 Hz to 150 Hz. An additional advantage of loudspeaker system 10 lies in its intended application. Driving point efficiency studies done in several vehicles demonstrated that there is generally an advantage of about 3 dB gained by driving the bass source from under the rear seat, rather than through the rear deck. Combining this 3 dB advantage with the 3-5 dB system gain discussed above results in the loudspeaker system having an overall gain of 6-8 dB over a single deck mounted loudspeaker driver. This makes the single loudspeaker driver system output approximately equal to two deck mounted loudspeaker drivers.

Yet another advantage lies in the efficient use of space corresponding to the shape and fit of the loudspeaker system. Since a good portion of the system fits under the rear seat, this otherwise unused space in the automobile is converted into an acoustic waveguide. Similarly, the proximal portion of the loudspeaker system fits snugly against the back of the rear seat presenting a low profile, minimal intrusion into the trunk space.

Preferably the acoustic conduit 12 of the loudspeaker system reproduces only spectral components below about substantially 150 Hz so that the source is not easily localizable to listeners allowing monophonic reproduction of these components in the stereo signal while the listeners perceive a good stereo image from receiving higher frequency spectral components from other loudspeaker drivers communicating with the passenger compartment.

Figure 9:
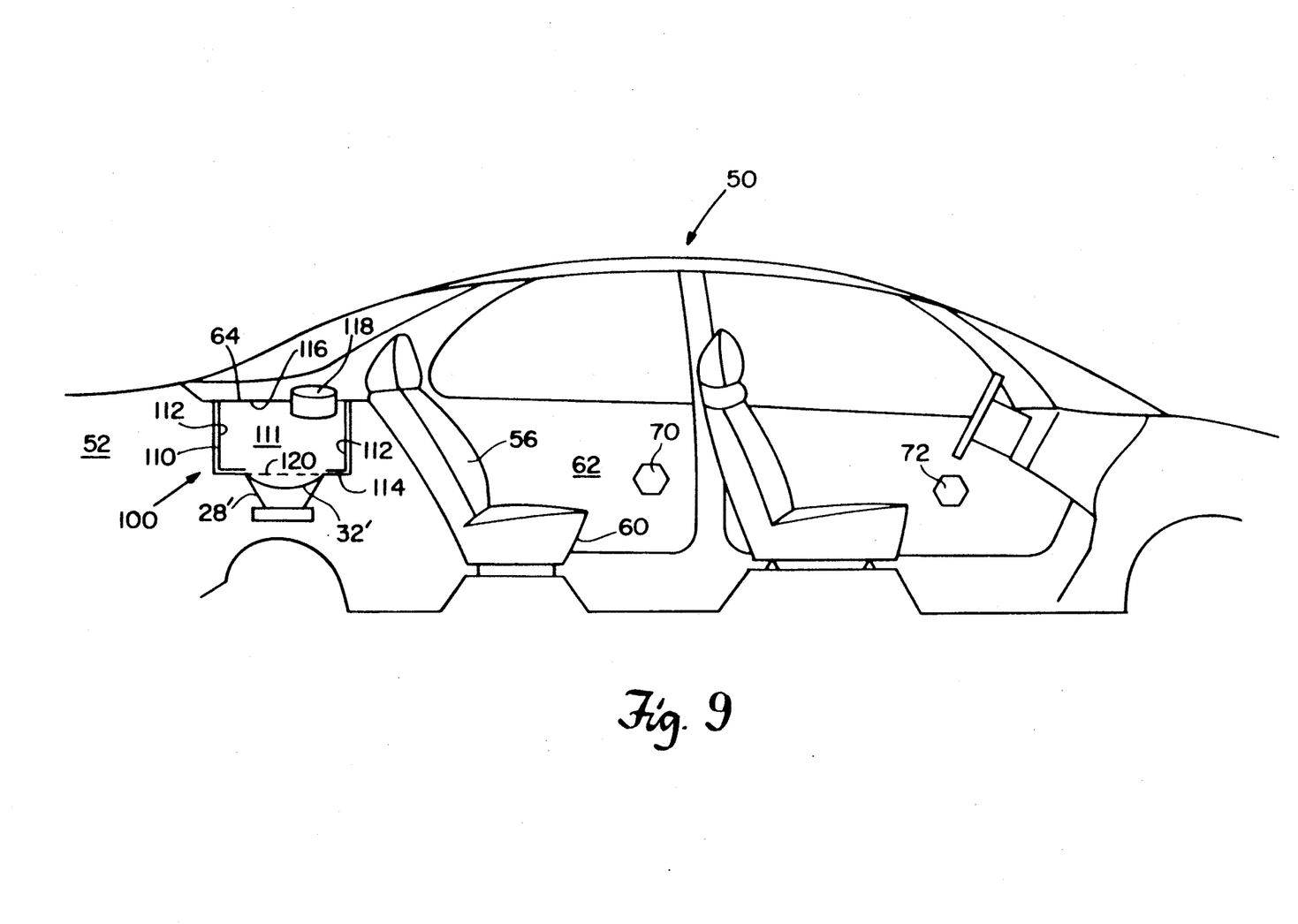
FIG. 9 is a side view of an embodiment of an air mass resonance tuned-port loudspeaker system of this invention mounted in an automobile.

Referring to FIG. 9, there is shown an embodiment of another loudspeaker system 100, characterized by a deep bass response, installed in automobile 50. Loudspeaker system 100 includes a box-like enclosure 110 defining an acoustic cavity 111 and having four essentially perpendicular side surfaces 112 (only two shown), a bottom surface 114, and a top surface 116 defined by the rear automobile deck 64. A loudspeaker driver 28' is mounted on bottom surface 114 over an opening 120, or input port, to acoustic cavity 111. A cylindrical acoustic port 118 passes through automobile deck 64 to define an opening, or output port, from acoustic cavity 111 to passenger compartment 62 for coupling the acoustic cavity to the passenger compartment. Acoustic cavity 111 and acoustic port 118 act together to create a tuned-port acoustic system.

Acoustic cavity 111 and acoustic port 118 together provide a direct path for front waves (i.e., sound pressure waves generated by the front of speaker cone 32') into passenger compartment 62. Back waves (i.e., sound pressure waves generated by the back of speaker cone 32') are directed into automobile trunk 52 which, as discussed above, is a large sealed enclosure substantially isolated from passenger compartment 62, i.e., an "infinite baffle". The stiff walls of acoustic enclosure 110 further help to isolate the front waves from the back waves and prevent them from cancelling each other.

Figure 10:
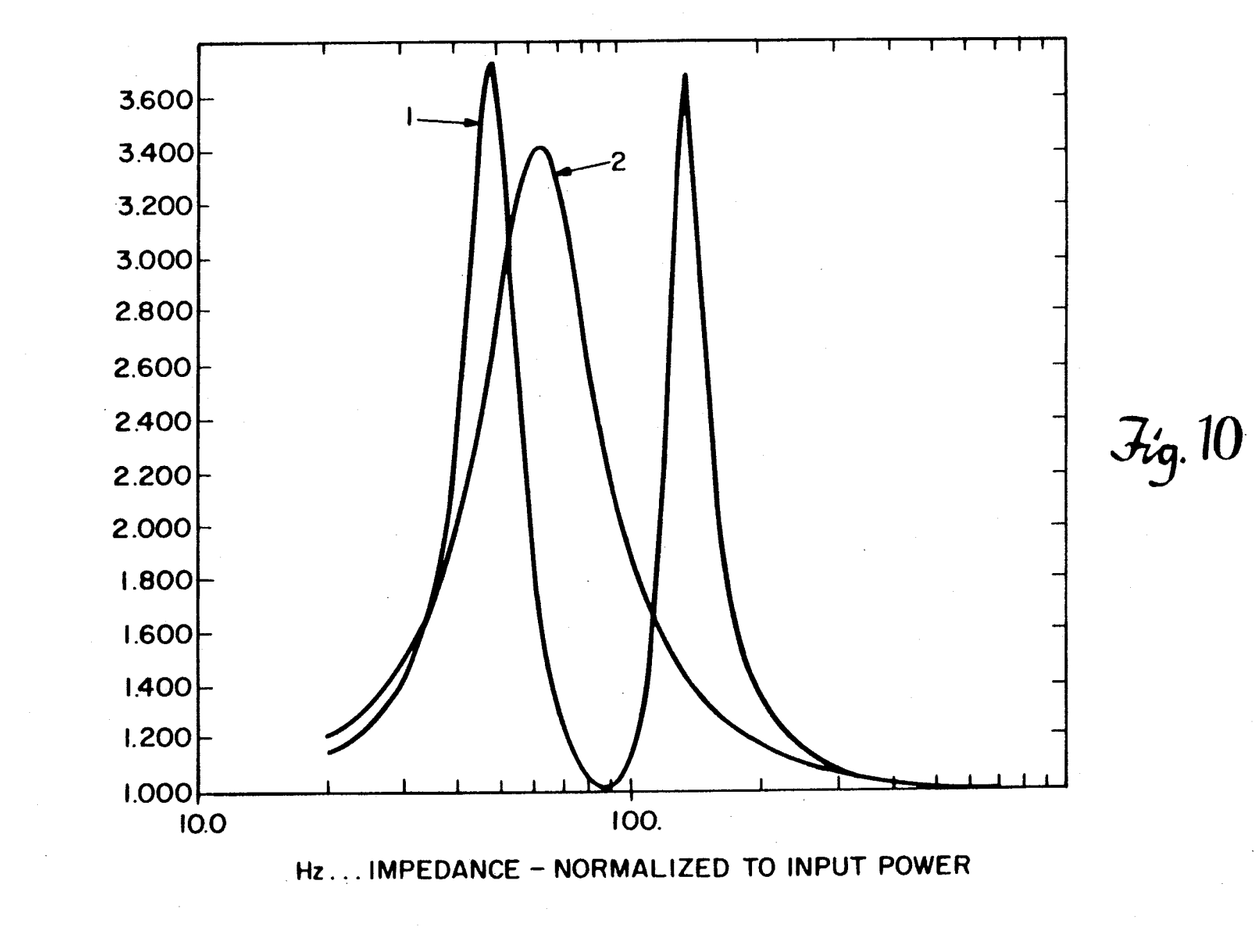
FIG. 10 shows the electrical impedance frequency response for the loudspeaker driver alone and mounted in the tuned-port loudspeaker system of FIG. 9.

Referring to FIG. 10, there is shown a graph of the electrical loudspeaker driver impedance, normalized to input power, versus frequency of the loudspeaker system embodiment of FIG. 9 (trace 1), overlaid on a graph of the electrical loudspeaker driver impedance, normalized to input power, of loudspeaker driver 28' alone (trace 2). As discussed above with reference to FIG. 5, electrical loudspeaker driver impedance roughly tracks the loudspeaker cone 32' excursion amplitude for a given input power, and is dependent on system resonances and resulting acoustic pressure on the loudspeaker cone. Trace 2 of FIG. 10 indicates that loudspeaker driver 28', by itself, has a natural resonance at about 65 Hz.. Similarly, trace of FIG. 10 indicates that loudspeaker driver 28' incorporated in loudspeaker system 100 (FIG. 9) has two resonances, of approximately 48 Hz. and 120 Hz., and a local minimum of about 88 Hz. between these two resonances.

Acoustic cavity (FIG. 9) and port 118 of loudspeaker system 100 act together as an air mass resonance tuned-port enclosure to effectively transform the natural electrical impedance response of loudspeaker driver 28' (trace 2) to the loudspeaker system electrical impedance response of trace 1. The air mass port resonance of the tuned-port enclosure is tuned to a frequency typically between 80 and 130 Hz, and accounts for the electrical impedance peak at approximately 120 Hz. of trace 1. Further, the relatively large air mass within acoustic cavity 111 presents a load to speaker cone 32', effectively increasing the loudspeaker driver's 28' moving mass. This results in lowering the natural resonant frequency of loudspeaker driver 28' from about 65 Hz. (i.e., the positive peak in the electrical loudspeaker driver impedance graph of trace 2) to about 48 Hz. (i.e., the far left positive peak of trace 1). Thus, the combined effects of the air mass port resonance and air mass loading dramatically change the response of loudspeaker driver 28' when incorporated as a component in loudspeaker system 100 of FIG. 9.

Figure 11:
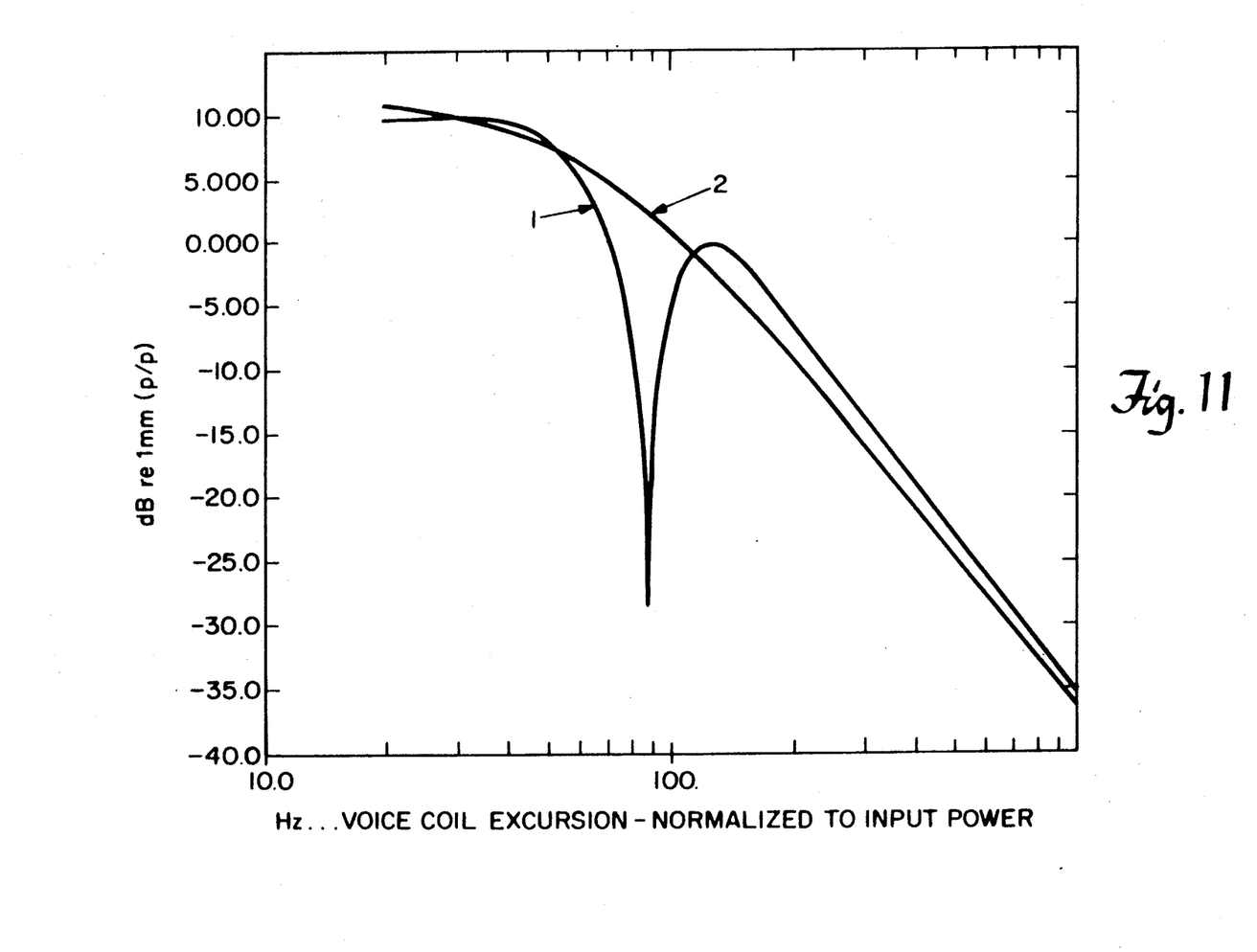
FIG. 11 shows the cone excursion frequency response for the loudspeaker driver alone and mounted in the tuned-port loudspeaker system of FIG. 9.

Referring to FIG. there is shown a graph of excursion amplitude versus frequency, similar to that of FIG. 6, for speaker cone 32' of loudspeaker driver 28' both by itself (trace 2), and in loudspeaker system 100 (trace 1). Here, the natural cone excursion response of trace 2 is transformed into the system cone excursion response of trace 1 by pressure loading on the cone caused by the combination of the air mass resonance of the tuned port enclosure and the large air mass within acoustic cavity 111. Loudspeaker system 100 has a single cone excursion local minimum at about 88 Hz. due to the high pressure at speaker cone 32' caused by the air mass in acoustic cavity 111 at this frequency located between the system resonance peaks at about 48 Hz. and 120 Hz.. The cone excursion responses of both traces and 2 respond similarly at frequencies substantially above and below the local minimum at 88 Hz.. Cone excursions reach a maximum for both traces 1 and 2 as they approach the lowest reproducible audio frequencies (i.e., 20 Hz.).

Figure 12:
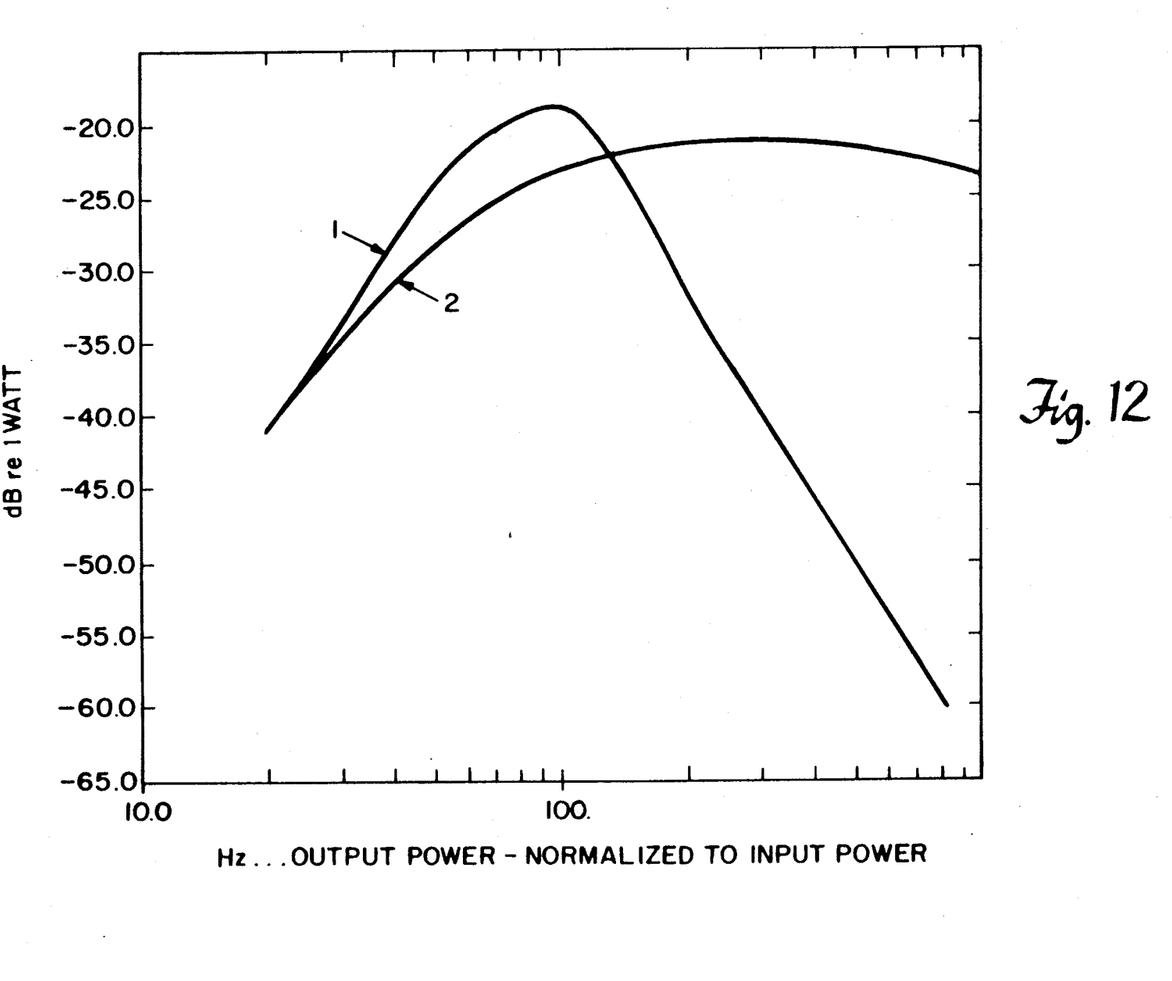
FIG. 12 shows the power output frequency response for the loudspeaker driver alone and mounted in the tuned-port loudspeaker system of FIG. 9.
Figure 13:
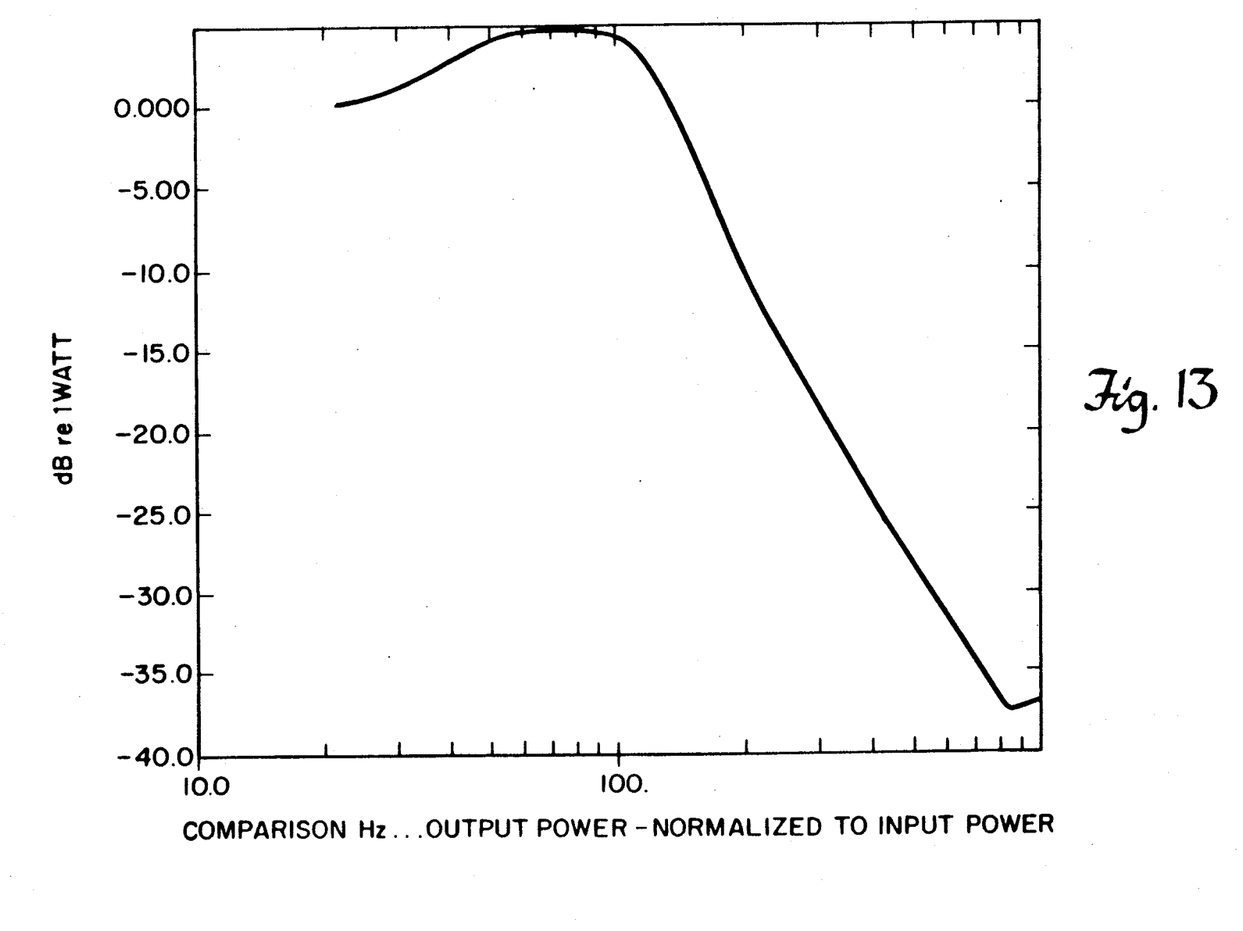
FIG. 13 shows the difference between the two power output frequency responses of FIG. 12.

Referring to FIGS. 12 and 13, there are shown graphs of loudspeaker system 100 performance gains over a conventional rear deck mounted automobile loudspeaker driver of the same type (i.e., loudspeaker driver 28') used to drive loudspeaker system 100. FIG. 12 shows loudspeaker system 100 (trace 2) acoustic output power, in dB relative to 1 watt input, versus frequency, overlaid on a graph of acoustic output power versus frequency for loudspeaker driver 28' (trace 1) mounted on the rear deck 64 (FIG. 9) of automobile 50. FIG. 13 is a graph of the difference between trace 1 and trace 2 of FIG. 12 (i.e., [trace 1−trace 2] in dB). As apparent from the graphs, there is significant power gain, on the order of about 2 to 5 dB, over a frequency range of about 30 to 120 Hz.. This corresponds well to the intended operational frequency range for the deep bass reproduction desired from loudspeaker system 100.

This embodiment also offers several compelling advantages in reproducing deep bass audio over conventional rear deck mounted automobile loudspeakers.

As described above acoustic cavity 111 and port 118 of loudspeaker system 100 act as a tuned-port enclosure and air mass load to boost the loudspeaker driver output by approximately 2 to 5 dB in the deep bass range of 20 Hz to 120 Hz..

Preferably the acoustically tuned enclosures of the loudspeaker systems 10 and 100 reproduce only spectral components below substantially 150 Hz so that the source is not easily localizable to listeners allowing monophonic reproduction of these components in the stereo signal while the listeners perceive a good stereo image from receiving higher frequency spectral components from other loudspeaker drivers communicating with the passenger compartment.

There has been described novel apparatus and techniques for providing an economical improved loudspeaker system for installation in a vehicle in conveniently available space with negligible intrusion into the passenger compartment capable of faithfully and efficiently reproducing signals extending into the deep bass range with relatively compact structure especially suited for installation in a vehicle. It is evident that those skilled in the art may now take numerous uses and modifications of and departures from the specific embodiments and techniques described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A vehicle loudspeaker system comprising,
   a vehicle body having inside surfaces enclosing a passenger compartment,
   at least one elongated conduit having a proximal portion and a distal portion,
   a loudspeaker driver disposed in said vehicle body outside said passenger compartment, said loudspeaker driver having a vibratile surface for generating sound pressure waves in response to electrical stimulation, and
   said proximal portion of said elongated conduit being open to one side of said vibratile surface of said loudspeaker driver, and said distal portion of said elongated conduit being open to said passenger compartment,
   said elongated conduit extending from said vibratile surface of said loudspeaker driver into said passenger compartment with an effective length corresponding substantially to a quarter wavelength at the lowest frequency of sound pressure waves to be transmitted between said vibratile surface and said passenger compartment,
   said loudspeaker driver characterized by moving mass and an unloaded natural resonant frequency at a first bass frequency,
   said elongated conduit enclosing on the inside of said elongated conduit a relatively large air mass sufficiently large to coact with said loudspeaker driver and present a load that effectively increases said moving mass so that said loudspeaker driver loaded by said air mass is characterized by a loaded natural resonant frequency at a second bass frequency significantly lower than said first bass frequency.

2. The vehicle loudspeaker system of claim 1, further comprising
   a loudspeaker mounting panel disposed at said proximal portion of said elongated conduit having said loudspeaker driver characterized by front face geometry mounted thereon,
   said loudspeaker mounting panel having an aperture substantially sized corresponding substantially to said front face geometry to accommodate said vibratile surface,
   and located between the inside of said elongated conduit and said vehicle body outside said passenger compartment.

3. The vehicle loudspeaker system of claim 1 wherein said proximal portion of said elongated conduit is characterized by length and has a rectangular cross section of increasing area over the length of said proximal portion.

4. The vehicle loudspeaker system of claim 1, wherein said elongated conduit has hard inside walls.

5. A vehicle loudspeaker system comprising,
   a vehicle body having inside surfaces enclosing a passenger compartment,
   an enclosure having a proximal and a distal end,
   a loudspeaker driver disposed in said vehicle body outside said passenger compartment, said loudspeaker driver having a vibratile surface for generating sound pressure waves in response to electrical stimulation,
   said proximal end of said enclosure being open to one side of said vibratile surface of said loudspeaker driver, and said distal end of said enclosure having an acoustical port opening to said passenger compartment,
   said loudspeaker driver characterized by moving mass and an unloaded natural resonant frequency at a first bass frequency,
   said enclosure enclosing on the inside of said enclosure a relatively large air mass sufficiently large to coact with said loudspeaker driver and present a load that effectively increases said moving mass so that said loudspeaker driver loaded by said air mass is characterized by a loaded natural resonant frequency at a second bass frequency significantly lower than said first bass frequency,
   said enclosure and said acoustical port opening cooperating together as an air mass resonance tuned-port enclosure having an air mass resonance corresponding substantially to a frequency between 50 Hz and 150 Hz.

6. The vehicle loudspeaker system of claim 5 wherein said air mass resonance corresponds substantially to between 80 Hz. and 120 Hz.

7. The vehicle loudspeaker system of claim 5, further comprising
   a loudspeaker mounting surface disposed at said proximal end of said enclosure having said loudspeaker driver characterized by front face geometry mounted thereon,
   said loudspeaker mounting surface having an aperture substantially sized corresponding substantially to said front face geometry to accommodate said vibratile surface,
   and located between the inside of said enclosure and said vehicle body outside said passenger compartment.

8. The vehicle loudspeaker system of claim 5, wherein said enclosure has hard inside walls.

9. A vehicle loudspeaker system in accordance with claim 1 wherein the difference between said first bass frequency and said second bass frequency is greater than a frequency substantially equal to one-third said second bass frequency.

10. A vehicle loudspeaker system in accordance with claim 9 wherein said difference is greater than a frequency slightly less than said second bass frequency.

11. A vehicle loudspeaker system in accordance with claim 1 wherein said passenger compartment includes a rear seat and said vehicle body includes a trunk,
and said distal portion is located beneath said rear seat with said proximal portion in said trunk.

12. A vehicle loudspeaker system in accordance with claim 9 wherein said first frequency is about 65 Hz and said second frequency is about 35 Hz.

13. A vehicle loudspeaker system in accordance with claim 9 wherein said first bass frequency is about 65 Hz and said second bass frequency is about 48 Hz.

14. A vehicle loudspeaker system in accordance with claim 5 wherein said vehicle body includes a trunk and a generally horizontal rear deck between said passenger compartment and said trunk,
said rear deck comprising a top surface of said enclosure,
said enclosure and said loudspeaker driver being inside said trunk.

* * * * *

UNITED STATES PATENT AND TRADEMARK OFFICE
CERTIFICATE OF CORRECTION

PATENT NO.   : 5,218,175

DATED        : June 8, 1993

INVENTOR(S)  : Stephen Scarlata

It is certified that error appears in the above-identified patent and that said Letters Patent are hereby corrected as shown below:

```
Column 5, line 67, after "trace" should be --1--.

Column 6, line 4, after "cavity" should be --111--.

Line 25, after "FIG." should be --11--.

Line 40, after "traces" should be --1--.
```

Signed and Sealed this

Tenth Day of May, 1994

*Attest:*

BRUCE LEHMAN

*Attesting Officer*    Commissioner of Patents and Trademarks